United States Patent
Spink et al.

(10) Patent No.: US 9,821,904 B2
(45) Date of Patent: Nov. 21, 2017

(54) LANDING GEAR WITH STRUCTURAL LOAD PATH DIVERTER BRACKET

(71) Applicant: GOODRICH CORPORATION, Charlotte, NC (US)

(72) Inventors: Charles J. Spink, Seattle, WA (US); Dennis W. Martin, Woodinville, WA (US)

(73) Assignee: GOODRICH CORPORATION, Charlotte, NC (US)

( * ) Notice: Subject to any disclaimer, the term of this patent is extended or adjusted under 35 U.S.C. 154(b) by 265 days.

(21) Appl. No.: 14/936,875

(22) Filed: Nov. 10, 2015

(65) Prior Publication Data

US 2016/0129994 A1  May 12, 2016

Related U.S. Application Data

(60) Provisional application No. 62/077,590, filed on Nov. 10, 2014.

(51) Int. Cl.
   *B64C 25/10*  (2006.01)

(52) U.S. Cl.
   CPC .................... *B64C 25/10* (2013.01)

(58) Field of Classification Search
   CPC ......... B64C 25/10; B64C 25/12; B64C 25/14; B64C 25/20; Y10T 403/32861; Y10T 403/32868; Y10T 403/32918
   See application file for complete search history.

(56) References Cited

U.S. PATENT DOCUMENTS

| 2,559,451 | A * | 7/1951 | McBrearty ............... B64C 25/14 188/289 |
| 6,016,995 | A * | 1/2000 | Squires ................... B64C 25/00 244/102 A |
| 6,273,632 | B1 * | 8/2001 | Takahashi ............... F16C 11/02 403/14 |
| 6,679,452 | B1 * | 1/2004 | Cottet ................... B64C 1/0009 244/102 R |
| 6,811,116 | B1 * | 11/2004 | Briancourt ............. B64C 25/12 244/100 R |
| 7,416,156 | B2 * | 8/2008 | Hinton ................... B64C 25/10 244/102 R |
| 7,887,009 | B2 | 2/2011 | Keeler, Jr. et al. |
| 8,523,107 | B2 | 9/2013 | Salmon et al. |
| 8,851,418 | B2 | 10/2014 | Ekmedzic et al. |
| 2006/0237584 | A1 * | 10/2006 | Hinton ................... B64C 25/10 244/102 R |
| 2009/0108131 | A1 * | 4/2009 | Lavigne .................. B64C 25/12 244/102 A |
| 2009/0321560 | A1 * | 12/2009 | Luce ....................... B64C 25/14 244/102 R |
| 2011/0155845 | A1 * | 6/2011 | Nannoni ................. B64C 25/14 244/17.17 |
| 2013/0134259 | A1 * | 5/2013 | Lieven ................... B64C 25/20 244/102 A |

FOREIGN PATENT DOCUMENTS

WO     201313389     9/2013

* cited by examiner

*Primary Examiner* — Joseph W Sanderson
(74) *Attorney, Agent, or Firm* — Snell & Wilmer L.L.P.

(57) ABSTRACT

A landing gear support arrangement may comprise a cylinder, a pin pivotally coupled to the cylinder, a head attached to the pin having a portion extending radially from the pin, and a bracket coupled to the portion of the head configured to axially support the pin.

15 Claims, 5 Drawing Sheets

LANDING GEAR WITH STRUCTURAL LOAD PATH DIVERTER BRACKET

CROSS-REFERENCE TO RELATED APPLICATIONS

This Non-Provisional Patent Application claims priority to U.S. Provisional Application Ser. No. 62/077,590, filed Nov. 11, 2014 and entitled "STRUCTURAL LOAD DIVERTER BRACKET," of which is incorporated herein by reference in its entirety.

FIELD OF INVENTION

The present disclosure relates to landing gear, and, more specifically, to a trunnion cylinder oriented about an axis and coupled to a trunnion pin providing an axial load path.

BACKGROUND OF THE INVENTION

Aircraft landing gear are often deployed while an aircraft is on the runway and retracted into a landing gear bay while the aircraft is in flight. The deployment and retraction processes typically involve some pivoting of the landing gear relative to the mounting points on the aircraft. Often, the mounting points for the landing gear are exposed to debris and ice. During takeoff and landing, ice and debris can work into some of the mounting points and restrict the motion of the landing gear. In some instances the landing gear may be stuck in a deployed position in response to the buildup of debris at the mounting points.

SUMMARY OF THE INVENTION

According to various embodiments, a landing gear support arrangement is provided. The landing gear support arrangement may comprise a cylinder, a pin pivotally coupled to the cylinder, a head attached to the pin having a portion extending radially from the pin, and a bracket coupled to the portion of the head configured to axially support the pin.

In various embodiments, a flange of the bracket may be coupled to the head of the pin by at least one of a bolt or a pin. The bracket and the head may be coupled by a clevis joint. The pin may be configured to slideably engage a support structure in the axial direction. The pin may be configured to limit an axial range of motion of the trunnion cylinder.

According to various embodiments, a landing gear support arrangement may include a main cylinder and a trunnion cylinder in operable communication with the main cylinder. The trunnion cylinder may to allow the main cylinder to pivot relative to a first support structure. A trunnion pin may be pivotally coupled to the trunnion cylinder. A head may be in operable communication with the trunnion pin having a portion extending radially from the trunnion pin. A bracket may be coupled to a second support structure with the head configured to resist axial movement of the trunnion pin relative to the second support structure.

In various embodiments, the second support structure may comprise an aft wall of a landing gear bay. The first support structure may comprise a sidewall of the landing gear bay. The bracket may be coupled to the elongated head of the trunnion pin by at least one of a bolt or a pin. The bracket may also be coupled to the second support structure by at least one of a bolt or a rivet. The trunnion pin may be configured to slideably engage the first support structure in the axial direction. The trunnion pin may be configured to limit an axial range of motion of the trunnion cylinder.

According to various embodiments, a landing gear assembly may include a cylinder, a trunnion cylinder configured to pivotally couple the cylinder to a first support structure, and a trunnion pin slideably coupled to the trunnion cylinder. The trunnion cylinder may be centered about an axis with the cylinder configured to move into at least one of a stowed position or a deployed position in response to the trunnion cylinder pivoting about the axis. The trunnion pin may comprise an elongated head extending from the trunnion pin in a radial direction. A bracket may be coupled to a second support structure and the elongated head of the trunnion pin. The bracket may support the trunnion pin and the trunnion cylinder in an axial direction.

In various embodiments, the second support structure may comprise an aft wall of a landing gear bay and the first support structure may comprise a sidewall of the landing gear bay. The bracket may be coupled to the elongated head of the trunnion pin by at least one of a bolt or a pin. The bracket may also be coupled to the second support structure by at least one of a bolt or a rivet. The trunnion pin may be configured to slideably engage the first support structure in the axial direction. The trunnion pin may also be configured to limit an axial range of motion of the trunnion cylinder.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
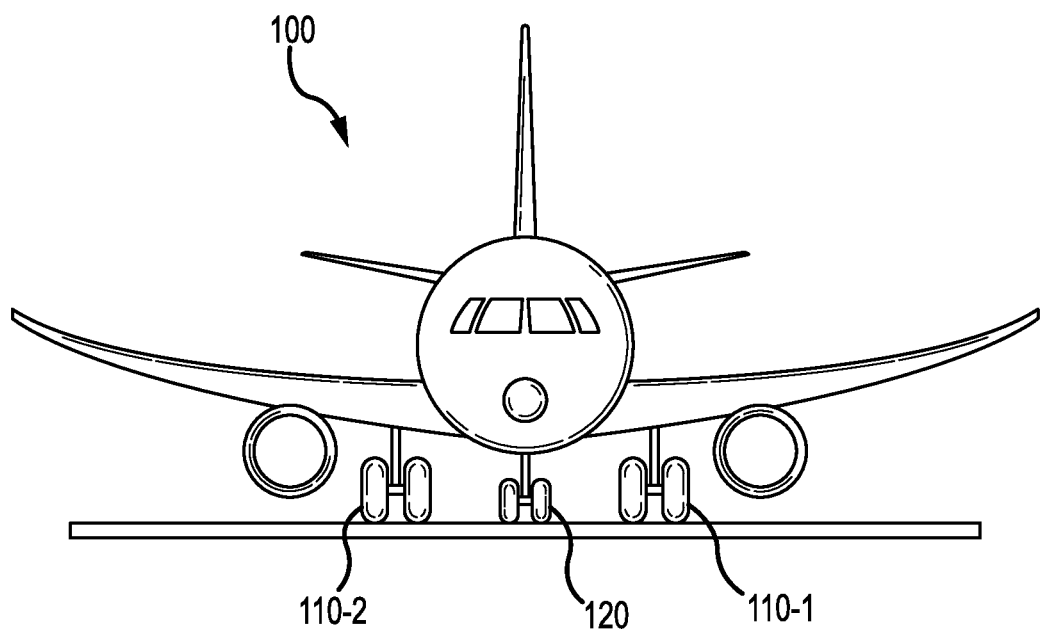
FIG. 1 illustrates an aircraft on the ground, in accordance with various embodiments.

With reference to FIG. 1, an aircraft 100 may comprise a landing gear system including a first main landing gear 110-1, a second main landing gear 110-2, and a nose landing gear 120, in accordance with various embodiments. Nose landing gear 120 may be installed in a forward portion of the aircraft fuselage (e.g., forward of the engines) at the nose of the fuselage. First main landing gear 110-1 and second main landing gear 110-2 may be installed aft of nose landing gear 120. First main landing gear 110-1, second main landing gear 110-2, and nose landing gear 120 may generally support the aircraft when it is not flying, allowing the aircraft to take off, land, and taxi without damage.

Figure 2:
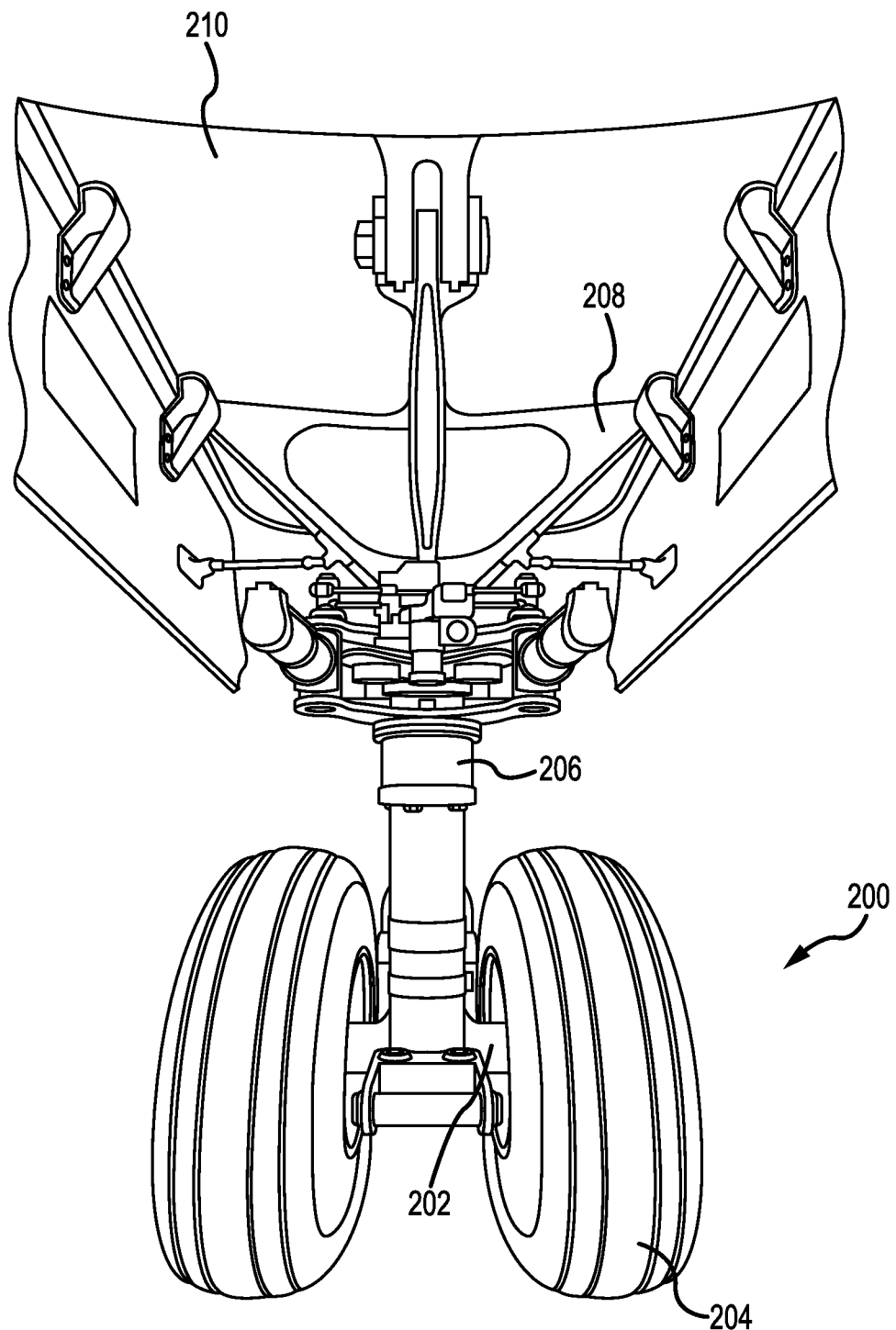
FIG. 2 illustrates a landing gear assembly comprising a trunnion, in accordance with various embodiments.

In various embodiments and with reference to FIG. 2, an exemplary landing gear assembly 200 is shown comprising an axle assembly 202 operably coupled to cylinder 206. Wheel and tire assemblies 204 may be rotatably coupled to an axle assembly 202. Landing gear assembly 200 may move from a deployed position (as depicted) to a stowed position by retracting landing gear assembly 200 into bay 210. Landing gear assembly 200 may be pivotally coupled to bay 210 through support 208. Support 208 may be formed integrally with, or coupled to, cylinder 206. Support 208 may comprise trunnion fittings, as disclosed in detail below, for pivotally mounting landing gear assembly 200.

Figure 3:
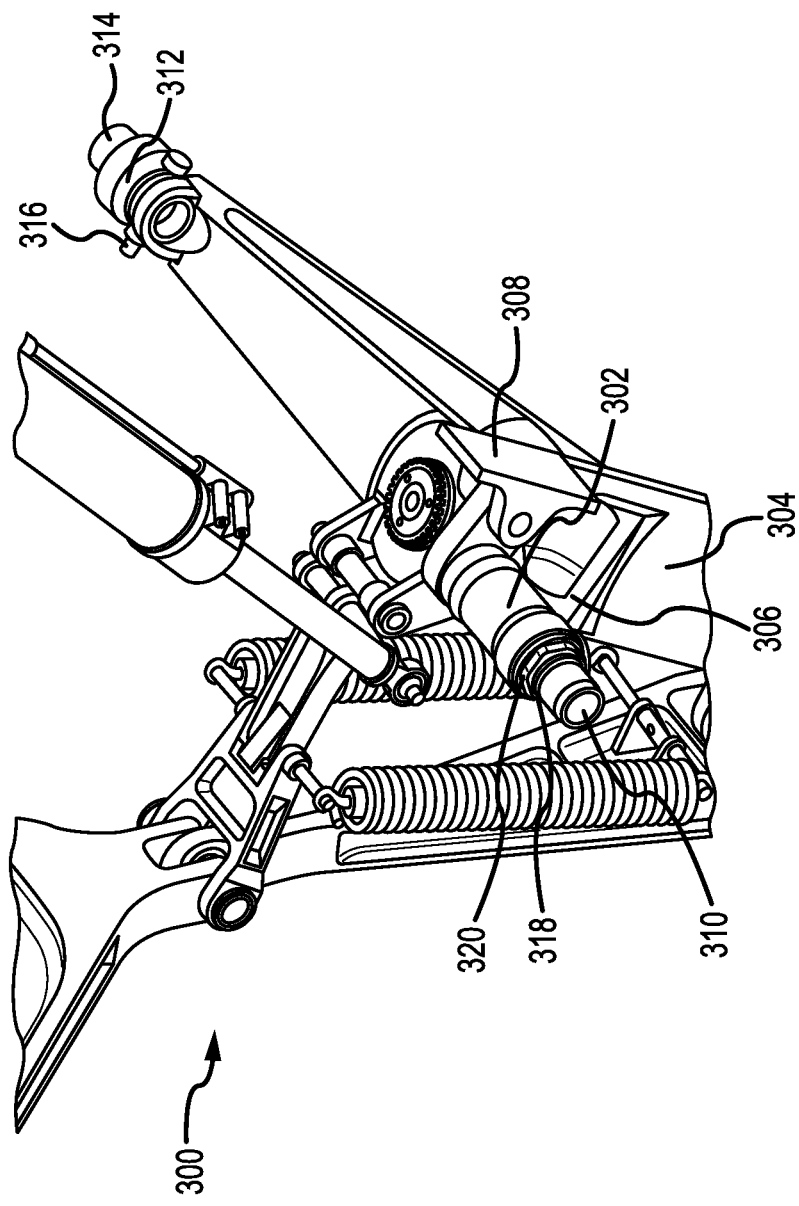
FIG. 3 illustrates a perspective view of a landing gear assembly comprising a trunnion pin with a head of the pin configured for coupling to a bracket, in accordance with various embodiments.

With reference to FIG. 3, landing gear support 300 is shown, in accordance with various embodiments. Landing gear assembly comprises main cylinder 304 with a support member 306 providing support for trunnion cylinder 302. Trunnion pin 310 may pivotally and slideably engage trunnion cylinder 302 so that trunnion pin 310 may rotate relative to main cylinder 304. Trunnion pin 310 may be coupled to bracket 308 for support, as disclosed in greater detail below. Trunnion pin 310 may threadedly engage nut 318 to retain washer 320 and trunnion cylinder 302 relative to trunnion pin 310. A trunnion cylinder 312 disposed on an arm of main cylinder 304 may provide additional support for main cylinder 304. Trunnion cylinder 312 may be axially aligned with trunnion cylinder 302. Trunnion cylinder 312 may include a trunnion pin 314 coupled to trunnion cylinder 312 by fastener 316. The trunnion cylinders and trunnion pins may provide pivot points to stow and deploy landing gear support 300.

Figure 4:
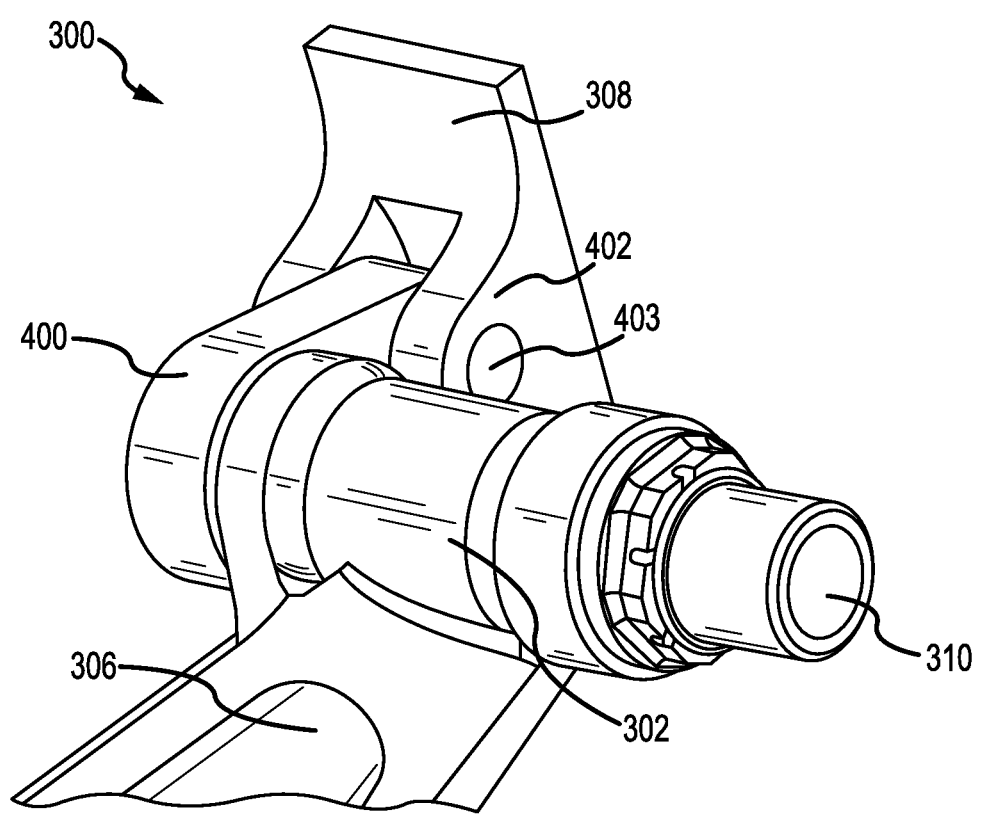
FIG. 4 illustrates a perspective of a trunnion of a cylinder having a pin interfacing with the cylinder and coupled to a bracket, in accordance with various embodiments.

With reference to FIG. 4, landing gear support 300 is shown with elongated head 400 of trunnion pin 310 engaging bracket 308. Elongated head 400 may be mechanically coupled to bracket 308 by a fastener such as a bolt or pin. The fastener may pass through an opening 403 in flanges 402 of bracket 308. Bracket 308 may comprise a plurality of the substantially parallel flanges 402 configured to engage elongated head 400 of trunnion pin 310 in a clevis-type joint. In that regard, flanges 402 may comprise a clevis, elongated head 400 may comprise a tang, and a fastener passing through the openings defined by flanges 402 may comprise a clevis pin.

Figure 5:
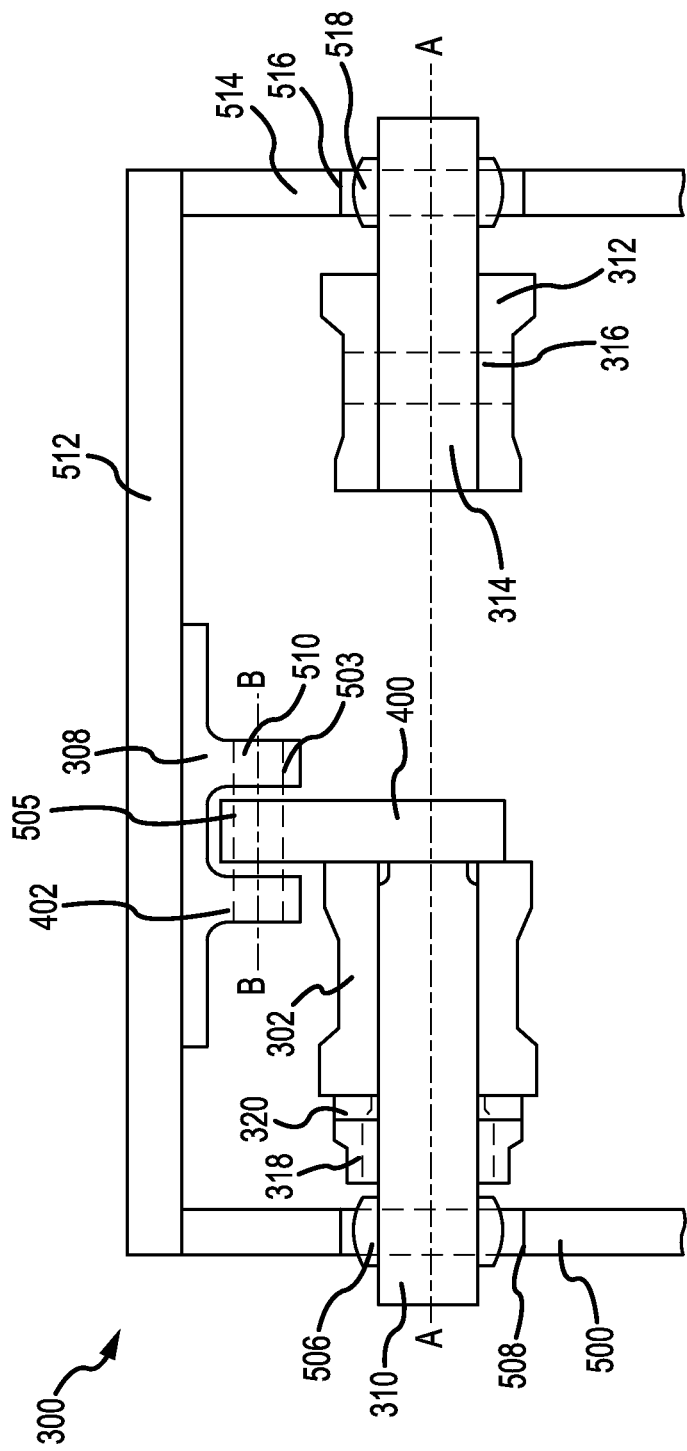
FIG. 5 illustrates a cross sectional view of a trunnion cylinder interfacing with a pin that is coupled to a bracket to absorb force in the axial direction, in accordance with various embodiments.

With reference to FIG. 5, a cross-sectional view of landing gear support 300 is shown, in accordance with various embodiments. Support structure 500 may define an opening 508 having a circular geometry. Spherical ball 506 may engage the walls of opening 508 at an outer diameter of spherical ball 506. Spherical ball 506 may also engage trunnion pin 310 at an inner diameter of spherical ball 506. Trunnion pin 310 extends through opening 508 in an axial direction relative to axis A, which is also the axis of trunnion pin 310 as depicted. Nut 318 and washer 320 may be axially adjacent to spherical ball 506 and support structure 500. Nut 318 may threadedly engage trunnion pin 310 to retain trunnion cylinder 302 between nut 318 and elongated head 400 of trunnion pin 310. In that regard, nut 318 and elongated head 400 of trunnion pin 310 may limit the range of motion of trunnion cylinder 302 in an axial direction. Trunnion cylinder 302 may be free to rotate about axis A relative to trunnion pin 310.

In various embodiments, elongated head 400 of trunnion pin 310 may be mechanically coupled to and/or fixed to bracket 308. Flanges 402 of bracket 308 may define axially aligned openings 503 about axis B. The axially aligned openings 503 of flanges 402 may further align with an opening 505 through elongated head 400 along axis B. Fastener 510 may extend through flanges 402 and elongated head 400 to mechanically couple bracket 308 to trunnion pin 310. Axis B may be parallel to axis A. Bracket 308 may further be coupled to, of formed integrally with, support structure 512. Support structure 512 may be adjacent to support structure 500. In various embodiments, support structure 512 and support structure 500 may be walls of a landing gear bay or a mounting bracket, with support structure 512 being an aft wall and support structure 500 being a lateral wall or sidewall.

In various embodiments, support structure 514 may define an opening 516. Opening 516 may engage spherical ball 518 and trunnion pin 314. Trunnion cylinder 312 may receive trunnion pin 314 to provide a pivoting mounting point for landing gear support 300 relative to support structure 514. Fastener 316 may couple trunnion pin 314 to trunnion cylinder 312. Trunnion cylinder 302 and trunnion cylinder 312 may be axially aligned along axis A.

In various embodiments, during operation, flanges 402 of bracket 308 may retain elongated head 400 in an axial direction along axis B by pressing axially against elongated head 400. Thus, a load path to distribute the axial load is formed from trunnion cylinder 302, through elongated head 400 of trunnion pin 310, through flanges 402 of bracket 308, and into support structure 512. The load path may eliminate and/or reduce the axial load born by support structure 500 and support structure 514. Support structure 500 and support structure 514 may thus bear radial loads relative to axis A and support structure 512 may bear axial loads relative to axis A. As a result, support structure 500 and support structure 514 may be made with lighter materials and/or designed to withstand lower axial loads. By moving the axial loading location of landing gear support 300, the likelihood of ice and/or debris preventing full articulation of landing gear support 300 is reduced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear support arrangement, comprising:
   a main cylinder;
   a trunnion cylinder in operable communication with the main cylinder and configured to allow the main cylinder to pivot relative to a first support structure;
   a trunnion pin pivotally coupled to the trunnion cylinder;
   a head of the trunnion pin having a portion extending radially from the trunnion pin; and
   a bracket coupled to a second support structure and the head configured to resist axial movement of the trunnion pin relative to the second support structure.

2. The landing gear support arrangement of claim 1, wherein the second support structure comprises an aft wall of a landing gear bay.

3. The landing gear support arrangement of claim 2, wherein the first support structure comprises a sidewall of the landing gear bay.

4. The landing gear support arrangement of claim 1, wherein the bracket is coupled to the head of the trunnion pin by at least one of a bolt or a pin.

5. The landing gear support arrangement of claim 1, wherein the bracket is coupled to the second support structure by at least one of a bolt or a rivet.

6. The landing gear support arrangement of claim 1, wherein the trunnion pin is configured to slideably engage the first support structure axially.

7. The landing gear support arrangement of claim 1, wherein the trunnion pin is configured to limit an axial range of motion of the trunnion cylinder.

8. The landing gear support arrangement of claim 1, wherein the bracket and the head are coupled by a clevis joint.

9. A landing gear assembly, comprising:
   a main cylinder;
   a trunnion cylinder configured to pivotally couple the main cylinder to a first support structure, wherein the trunnion cylinder is centered about an axis, wherein the main cylinder is configured to move into at least one of a stowed position or a deployed position in response to the trunnion cylinder pivoting about the axis;
   a trunnion pin slideably coupled to the trunnion cylinder, wherein the trunnion pin comprises an elongated head extending from the trunnion pin in a radial direction; and
   a bracket coupled to a second support structure and the elongated head of the trunnion pin, wherein the bracket is configured to support the trunnion pin and the trunnion cylinder in an axial direction.

10. The landing gear assembly of claim 9, wherein the second support structure comprises an aft wall of a landing gear bay.

11. The landing gear assembly of claim 10, wherein the first support structure comprises a sidewall of the landing gear bay.

12. The landing gear assembly of claim 9, wherein the bracket is coupled to the elongated head of the trunnion pin by at least one of a bolt or a pin.

13. The landing gear assembly of claim 9, wherein the bracket is coupled to the second support structure by at least one of a bolt or a rivet.

14. The landing gear assembly of claim 9, wherein the trunnion pin is configured to slideably engage the first support structure in the axial direction.

15. The landing gear assembly of claim 9, wherein the trunnion pin is configured to limit an axial range of motion of the trunnion cylinder.

* * * * *